United States Patent
Kim et al.

(10) Patent No.: US 9,526,100 B2
(45) Date of Patent: Dec. 20, 2016

(54) METHOD FOR MORE EFFICIENTLY UTILIZING RADIO RESOURCES IN A WIRELESS COMMUNICATION SYSTEM INCLUDING A PLURALITY OF SMALL CELLS

(71) Applicant: LG ELECTRONICS INC., Seoul (KR)

(72) Inventors: Sunam Kim, Anyang-si (KR); Jaehoon Chung, Anyang-si (KR); Binchul Ihm, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/406,965

(22) PCT Filed: May 6, 2013

(86) PCT No.: PCT/KR2013/003905
§ 371 (c)(1),
(2) Date: Dec. 10, 2014

(87) PCT Pub. No.: WO2014/003308
PCT Pub. Date: Jan. 3, 2014

(65) Prior Publication Data
US 2015/0163800 A1    Jun. 11, 2015

Related U.S. Application Data

(60) Provisional application No. 61/665,860, filed on Jun. 28, 2012.

(51) Int. Cl.
| | | |
|---|---|---|
| H04W 4/00 | (2009.01) | |
| H04W 72/04 | (2009.01) | |
| H04L 5/00 | (2006.01) | |
| H04W 36/00 | (2009.01) | |

(52) U.S. Cl.
CPC .......... *H04W 72/0446* (2013.01); *H04L 5/00* (2013.01); *H04W 72/042* (2013.01); *H04W 36/0061* (2013.01); *H04W 72/0426* (2013.01)

(58) Field of Classification Search
CPC .......... H04W 72/0446; H04W 72/042; H04W 36/0061; H04L 5/00
See application file for complete search history.

(56) References Cited

U.S. PATENT DOCUMENTS

| | | | | |
|---|---|---|---|---|
| 2011/0149947 | A1 | 6/2011 | Kim et al. | |
| 2012/0201164 | A1* | 8/2012 | Jongren | H04L 5/0048 370/252 |
| 2013/0010766 | A1* | 1/2013 | Sadek | H04W 72/1215 370/336 |
| 2013/0029657 | A1* | 1/2013 | Gao | H04W 74/004 455/422.1 |
| 2014/0056165 | A1* | 2/2014 | Siomina | H04B 1/7083 370/252 |

FOREIGN PATENT DOCUMENTS

| | | |
|---|---|---|
| KR | 10-2009-0131621 | 12/2009 |
| KR | 10-2010-012037 | 2/2010 |
| KR | 10-2011-0029180 | 3/2011 |

OTHER PUBLICATIONS

NEC Group, "Configurable Time-Frequency locations for PSS/SSS signals on the NCT," TSG-RAN WG1#68Bis, R1-121329, Mar. 2012, 7 pages.
LG Electronics, "CSG Flag in Physical Cell ID," 3GPP TSG RAN WG1 #54, R1-082911, Aug. 2008, 9 pages.
PCT International Application No. PCT/KR2013/003905, Written Opinion of the International Searching Authority dated Aug. 13, 2013, 1 page.

* cited by examiner

*Primary Examiner* — Abdelnabi Musa
(74) *Attorney, Agent, or Firm* — Lee Hong Degerman Kang & Waimey

(57) ABSTRACT

One embodiment of the present invention provides a method for determining a radio resource by a terminal. According to the method, information on a second cell can be received from a first cell, wherein a radio resource of the first cell includes a plurality of wireless frames along a time axis, each wireless frame includes a plurality of subframes, and the information on the second cell can include an ID of the second cell. In addition, a radio resource of the second cell can be determined by using the information on the second cell, wherein the radio resource of the second cell can be determined as a partial region in the wireless frames or the subframes of the first cell, which is indicated by the information on the second cell.

8 Claims, 18 Drawing Sheets

METHOD FOR MORE EFFICIENTLY UTILIZING RADIO RESOURCES IN A WIRELESS COMMUNICATION SYSTEM INCLUDING A PLURALITY OF SMALL CELLS

CROSS-REFERENCE TO RELATED APPLICATIONS

This application is the National Stage filing under 35 U.S.C. 371 of International Application No. PCT/KR2013/00003905, filed on May 6, 2013, which claims the benefit of U.S. Provisional Application Ser. No. 61/665,860, filed on Jun. 28, 2012, the contents of which are all hereby incorporated by reference herein in their entirety.

BACKGROUND OF THE INVENTION

Field of the Invention

The present invention relates to a method for determining a radio resource in a wireless communication system.

Related Art

The next-generation multimedia wireless communication systems which are recently being actively researched are required to process and transmit various pieces of information, such as video and wireless data as well as the initial voice-centered services.

The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, the amount of data that is communicated through a wireless communication system is rapidly increasing. Various techniques are being developed to satisfy demand for increased data. For efficient use of more frequency bands, research on carrier aggregation (CA) and cognitive radio (CR) and other technologies are underway. Further, multi-antenna technologies and multi-base station cooperative technologies are being studied in order to increase data capacity in a limited frequency band. In the words, wireless communication systems are expected to evolve to have an increased density of nodes to which users may gain access. Wireless communication systems of high node density may have further enhanced performance by cooperation between the nodes. In other words, a wireless communication system in which the nodes cooperate with each other shows much more excellent performance than a wireless communication system in which the nodes independently operate as a base station (BS), an advanced BS (ABS), a Node-B (NB), an eNode-B (eNB), and an access point (AP).

A distributed multi-node system (DMNS) having a plurality of nodes in a cell may apply to enhance the performance of wireless communication system. The multi-node system may include a distributed antenna system (DAS), a radio remote head (RRH) or the like. Further, there is ongoing standardization for applying, to a DMNS, various MIMO (Multiple-Input Multiple-Output) schemes and cooperative communication schemes that have been already developed or will be applicable in the future.

SUMMARY OF THE INVENTION

Accordingly, the disclosure of the invention aims to propose a method for more efficiently utilizing radio resources in a wireless communication system such as a distributed antenna system (DAS).

To achieve the above objects, a disclosure of the present invention provides a method for determining a radio resource. The method may be performed by a terminal and comprise: receiving, from a first cell, information on a second cell. Here, a radio resource of the first cell includes a plurality of radio frames along a time axis, each radio frame including a plurality of sub-frames, and the information on the second cell including an ID of the second cell. The method may comprise: determining a radio resource of the second cell using the information on the second cell. Here, the radio resource of the second cell is determined as a partial region in the radio frame or the sub-frame of the first cell, which is indicated by the information on the second cell.

To achieve the above objects, a disclosure of the present invention provides a terminal, comprising: an RF unit configured to receive, from a first cell, information on a second cell. Here a radio resource of the first cell includes a plurality of radio frames along a time axis, each radio frame including a plurality of sub-frames, and the information on the second cell including an ID of the second cell. The terminal may comprise: a processor configured to determine a radio resource of the second cell using the information on the second cell. Here, the radio resource of the second cell is determined as a partial region in the radio frame or the sub-frame of the first cell, which is indicated by the information on the second cell.

The information on the second cell may received through an RRC message or a control channel.

The determined radio resource of the second cell may include a plurality of sub-frames where no control information for the first cell is transmitted in a radio frame.

A sub-frame where the control information for the first cell is transmitted is a sub-frame where a primary synchronization signal (PSS) and a secondary synchronization signal (SSS) are transmitted.

On the partial region in the radio frame or sub-frame of the first cell, which is indicated by the information on the second cell, a reference signal received power (RSRP) and a reference signal received quality (RSRQ) are measured, but are not used as a criterion for handover.

when a cell reselection to the second cell or a handover to the second cell is performed, data is transmitted and received on the determined radio resource.

According to the disclosure of the present invention, a cell may be flexibly operated by utilizing an antenna node in a distributed antenna system (DAS). Further, according to the disclosure of the present invention, a radio resource may be flexibly assigned to an antenna node. Still further, according to the disclosure of the present invention, a plurality of cell IDs may be assigned to an antenna node, and based on the same, the single antenna node may be utilized for multiple areas or purposes. Further, the system may be configured more flexibly and optimized by distributed antennas.

DESCRIPTION OF EXEMPLARY EMBODIMENTS

Figure 1:
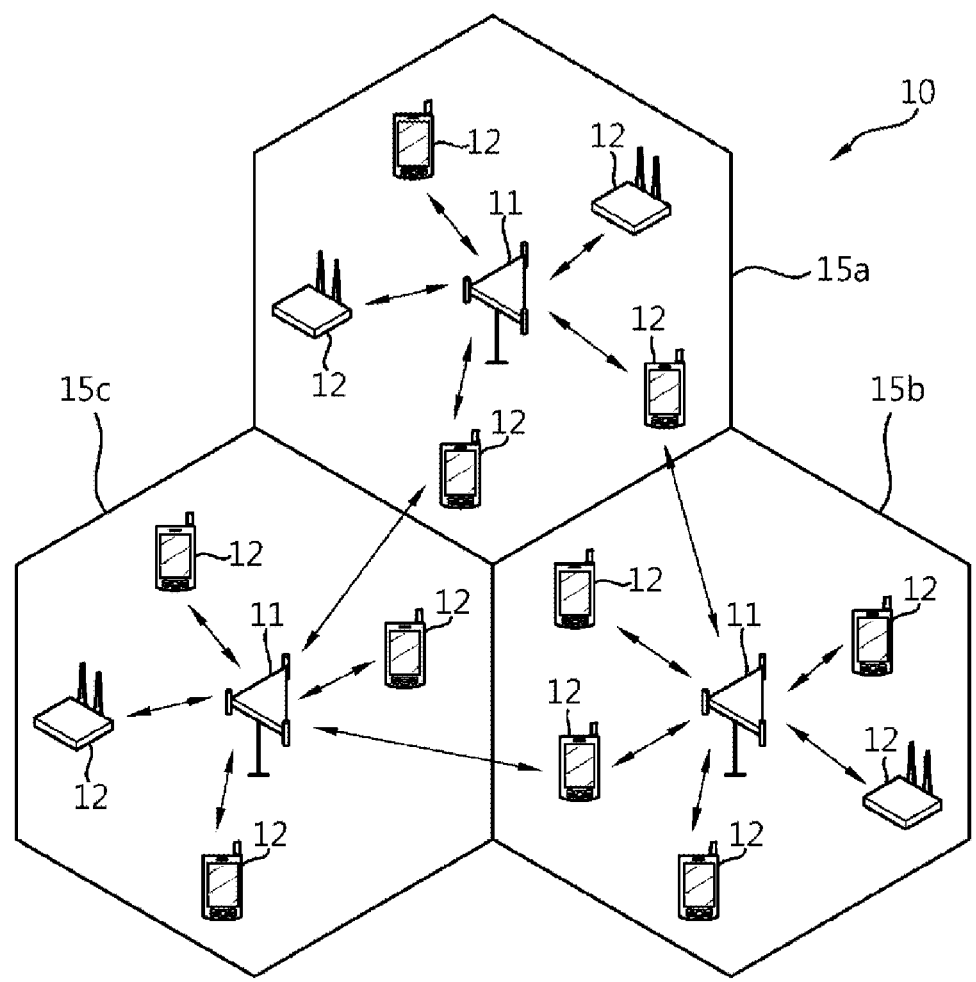
FIG. 1 illustrates a wireless communication system.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

A wireless device may be fixed or mobile, and may be referred to as another terminology, such as a terminal, a mobile terminal (MT), a user equipment (UE), a mobile equipment (ME), a mobile station (MS), a user terminal (UT), a subscriber station (SS), a handheld device, an access terminal (AT), etc.

A base station (BS) is generally a fixed station that communicates with the UE and may be referred to as another terminology, such as an evolved Node-B (eNB), a base transceiver system (BTS), an access point, etc.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3rd generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

The radio interface protocol layers between the terminal 12 and the base station 11 may be separated into L1 (first layer), L2 (second layer), and L3 (third layer) based on the lower three layers of the open system interconnection (OSI) model that is well known in the communication system.

The first layer, physical layer, is connected to its higher layer, medium access control (MAC) layer via a transport channel, and data travels between the MAC layer and the physical layer through the transport channel. Data travels through a physical channel between different physical layers, i.e., between the physical layer of the transmission side and the physical layer of the reception side.

The second layer, radio data link layer, includes an MAC layer, an RLC layer, and a PDCP layer. The MAC layer is in charge of mapping between a logical channel and a transport channel, and the MAC layer selects a proper transport channel and adds necessary control information to the header of an MAC PDU (Protocol Data Unit) in order to transmit the data transported from the RLC layer.

The RLC layer is located at a higher position of the MAC layer and supports reliable data transmission. Further, the RLC layer performs segmentation and concatenation on the RLC SDUs (Service Data Units) transported from a higher layer in order to configure data of a size suitable for the radio section. The RLC layer of a receiver supports a reassembling function of data in order to restore the original RLC SDU from received RLC PDUs.

The PDCP layer is used only for the packet exchange area, and the PDCP layer may compress and transmit the header of an IP packet to increase the transmission efficiency of the packet data on a radio channel.

The radio resource control (RRC) layer which is positioned at the uppermost part of the third layer is defined only in the control plane, and the RRC layer is in charge of controlling logical channel, transport channels, and physical channels in association with configuration, reconfiguration, and release of radio bearers (RBs). Here, the term "RB" refers to a logical path provided by the first and second layer of a radio protocol for data transmission between a terminal and a UTRAN. An RB being configured typically means a process of specifying the characteristics of radio protocol layers and channels necessary to provide a specific service and setting each specific parameter and operation method. RBs are classified into SRBs (Signaling RBs) and DRBs (Data RBs). An SRB is used as a pathway for transmitting an RRC message in the C-plane, and a DRB is used as a pathway for transmitting user data in the U-plane.

In the RRC layer are defined various procedures relating to radio resource management, including a system information broadcast and RRC connection management procedure, a multi-component carrier configuration procedure, a radio bearer control procedure, a security procedure, a measurement procedure, and a mobility management procedure (handover).

Meanwhile, in the RRC layer are defined various RRC states such as idle mode and RRC connected mode depending on the communication state of a terminal, wherein the RRC states may transition between each other as necessary.

Here, the RRC connected mode or idle mode, in the definition, refers to whether a terminal's RRC is in a logical connection with an E-UTRAN's RRC, and if the RRCs are logically connected with each other, this is referred to as RRC connected mode, and otherwise, as idle mode. In RRC connected mode, a terminal has an RRC connection, and thus, an E-UTRAN may grasp the presence of the terminal on a per-cell basis, and accordingly, the E-UTRAN may effectively control the terminal. In contrast, when the terminal is in idle mode, the E-UTRAN cannot grasp the presence of the terminal, and a core network performs management on a per-TA (Tracking Area) basis, where the TA is larger in area than a cell. In other words, when a terminal is in an RRC_IDLE state, only whether the terminal is present or not is grasped for each area that is larger in size than a cell, and the terminal should transition to RRC connected mode to receive a typical mobile service such as voice or data.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
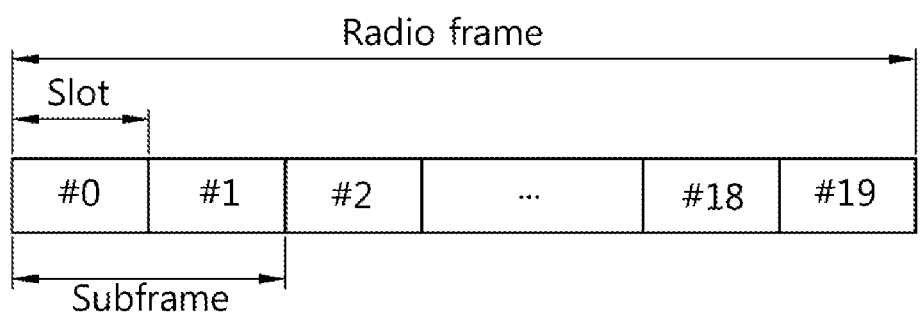
FIG. 2 illustrates the structure of a radio frame in 3GPP LTE.

FIG. 2 shows a downlink radio frame structure in 3rd generation partnership project (3GPP) long term evolution (LTE).

The section 5 of 3GPP TS 36.211 V8.2.0 (2008 March) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
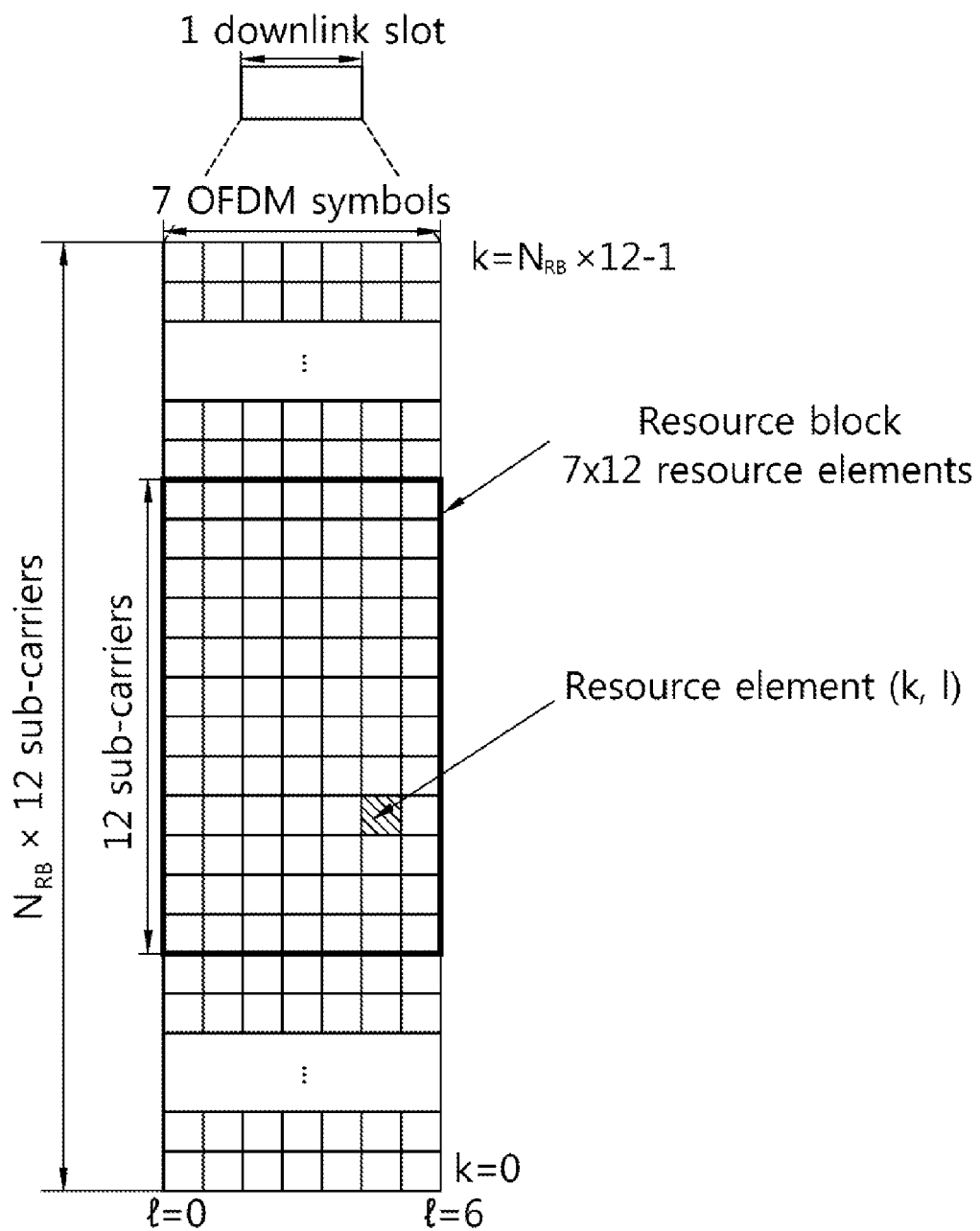
FIG. 3 is a view illustrating an exemplary resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N^{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

Figure 4:
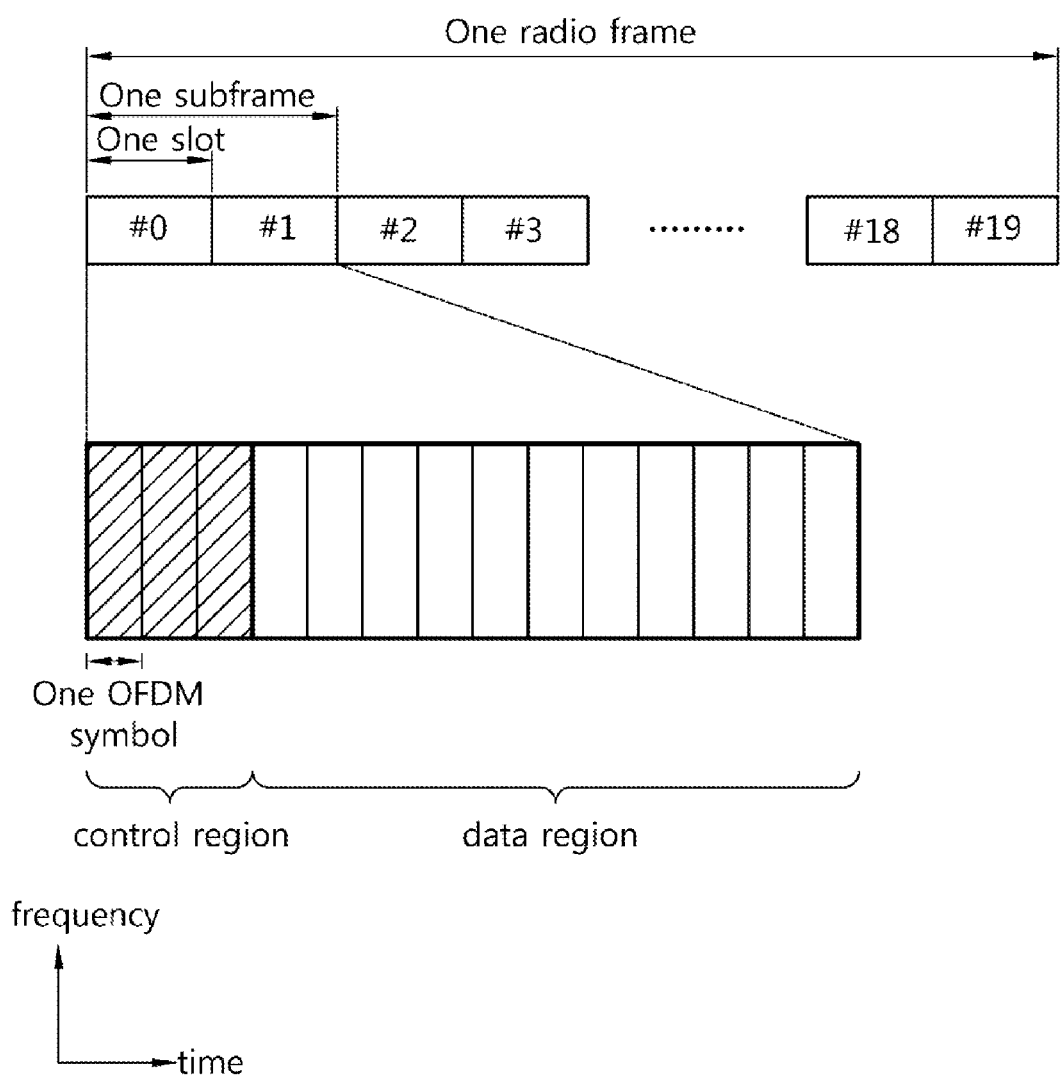
FIG. 4 illustrates the structure of a downlink sub-frame.

In 3GPP LTE, the resource grid for one uplink slot shown in FIG. 4 may also apply to the resource grid for the downlink slot.

FIG. 4 illustrates the architecture of a downlink sub-frame.

For this, 3GPP TS 36.211 V10.4.0 (2011 December) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 4, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgment)/NACK (negative-acknowledgment) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
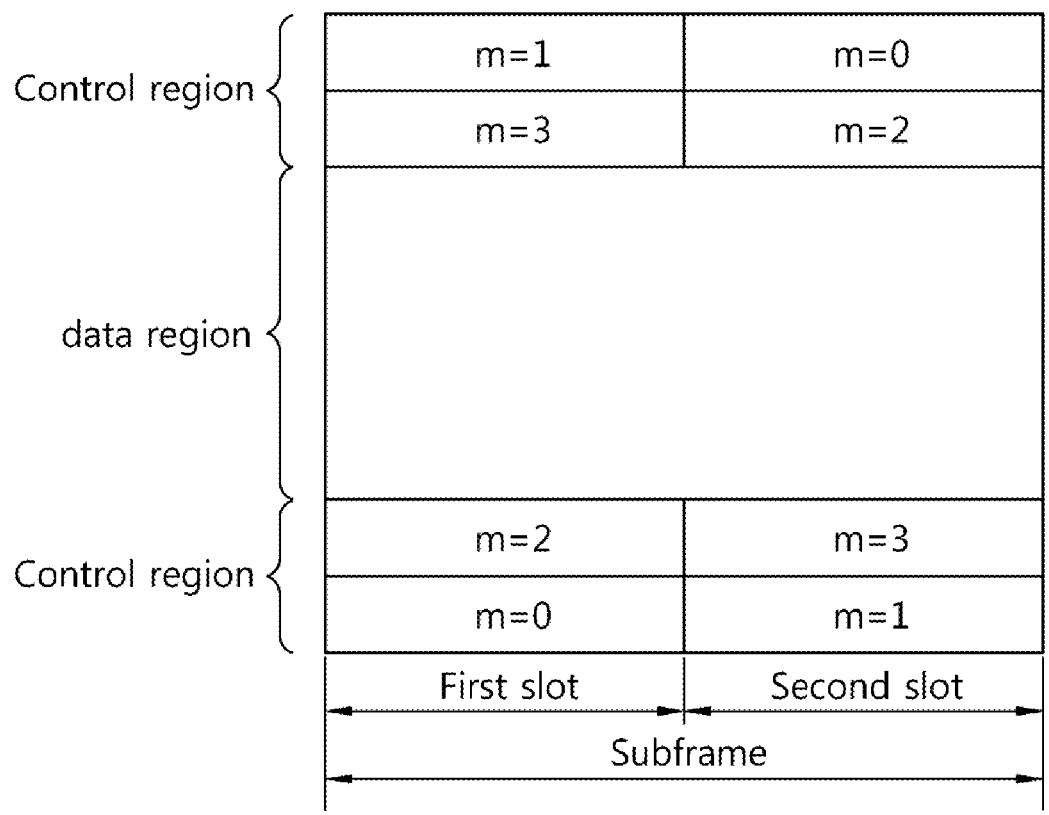
FIG. 5 illustrates the structure of an uplink sub-frame in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgment)/NACK (non-acknowledgment), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
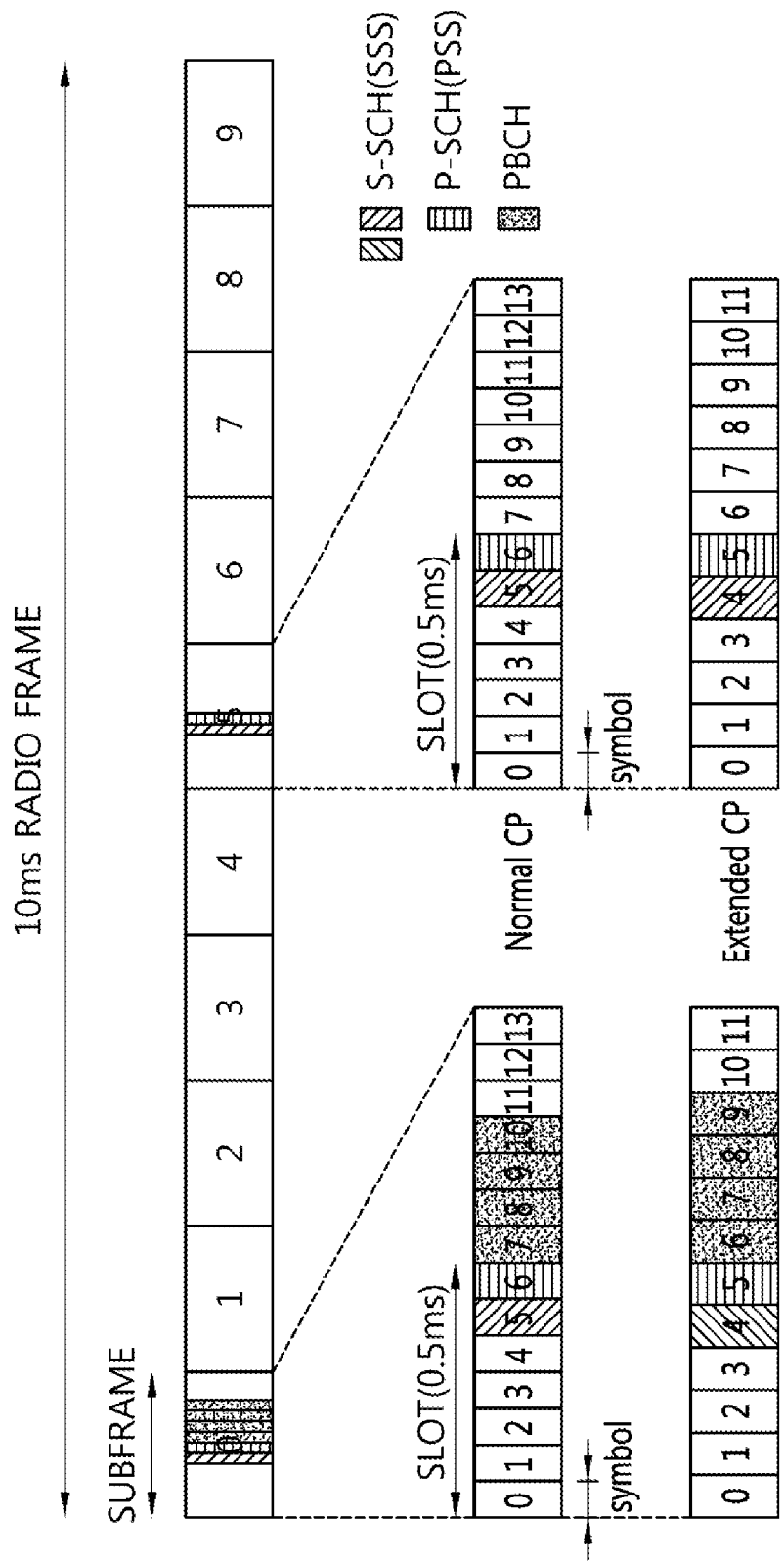
FIG. 6 illustrates a frame architecture for sync signal signal transmission in an FDD frame according to a conventional art.

FIG. 6 illustrates a frame architecture for sync signal signal transmission in an FDD frame according to a conventional art. The slot numbers and subframe numbers start with 0.

A terminal may be synced in time and frequency based on a synchronization signal received from a base station. 3GPP LTE-A synchronization signals are used for cell detection, and the synchronization signals may be classified into primary synchronization signals (PSSs) and secondary synchronization signals (SSSs). For details of the 3GPP LTE-A synchronization signals, refer to 3GPP TS V10.2.0 (2011 June), Ch. 6.11.

A PSS is used to achieve outer surface is used to achieve an OFDM symbol sync or slot sync, and the PSS is associated with a physical layer cell ID (PCI Identity). An SSS is used to achieve a frame sync. Further, an SSS is used to detect a CP length and to obtain a physical layer cell group ID.

Synchronization signals may be transmitted for each of sub-frame 0 and sub-frame 5 considering the length, 4.6 ms, of a GSM (Global System for Mobile communication) frame to facilitate inter-RAT (Radio Access Technology) measurement, and a boundary for a frame may be detected through an SSS. Specifically, in an FDD system, PSSs are transmitted in the last OFDM symbols of slot 0 and slot 10, and SSSs are transmitted in the OFDM symbols very before the PSSs.

Three PSSs and 168 SSSs may be combined to transmit any one of a total of 504 physical layer cell IDs. A PBCH (Physical Broadcast Channel) is transmitted in the first four OFDM symbols of a first slot. A synchronization signal and a PBCH are transmitted in 6 RBs positioned in the middle of a system bandwidth to enable a terminal to perform detection or decoding regardless of transmission bandwidths. The physical channel on which a PSS is transmitted is referred to as a P-SCH, and the physical channel on which an SSS is transmitted is referred to as an S-SCH.

As a transmission diversity scheme of a synchronization signal, a single antenna port only is used, and no separate definition is not made in the standards. In other words, single antenna transmission or a transmission scheme transparent to terminal (for example, PVS (precoding vector switching), TSTD (time switched transmit diversity), CDD (cyclic delay diversity)) may be put in use.

For a PSS, a ZC (Zadoff-Chu) sequence whose length is 63 is defined in the frequency domain, and the sequence is used as a sequence of the PSS. A ZC sequence is defined in Equation 1, and the sequence element corresponding to a DC subcarrier, i.e., n=31, is subjected to punctuation. In Equation 1, Nzc=63.

$$d_u(n) = e^{-j\frac{\pi u n(n+1)}{N_{ZC}}} \quad \text{[Equation 1]}$$

Among 6 RBs (=72 sub-carriers), nine (=72-63) remaining sub-carriers are always transmitted with a value of 0, bringing up ease to design a filter. To define a total of three PSSs, u=25, 29, and 34 may be used in Equation 1. In this case, 29 and 34 are in a conjugate symmetry relation, and thus, two correlation operations may be simultaneously performed. Here, conjugate symmetry means the relation shown in Equation 2 as follows, and a one-shot correlator for u=29 and 34 may be implemented using such features, thus reducing the overall computation by about 33.3%.

$$d_u(n)=(-1)^n(d_{N_{2C}-u}(n))^*, \text{ when } N_{ZC} \text{ is even number.}$$

$$d_u(n)=(d_{N_{2C}-u}(n))^*, \text{ when } N_{ZC} \text{ is odd number.} \quad \text{[Equation 2]}$$

As a sequence of an SSS, two m-sequences each having a length of 31, which are interleaved, may be used. The SSS may transmit any one of a total of 168 cell group IDs by combining the two sequences. The m-sequences used as the sequences of the SSS are robust to a frequency selective environment, and the m-sequences may be subjected to fast m-sequence transform using the Fast Hadamard Transform, thus reducing computation. Further, configuring an SSS with two short codes, i.e., two m-sequences, has been proposed to reduce computation of a terminal.

Figure 7:
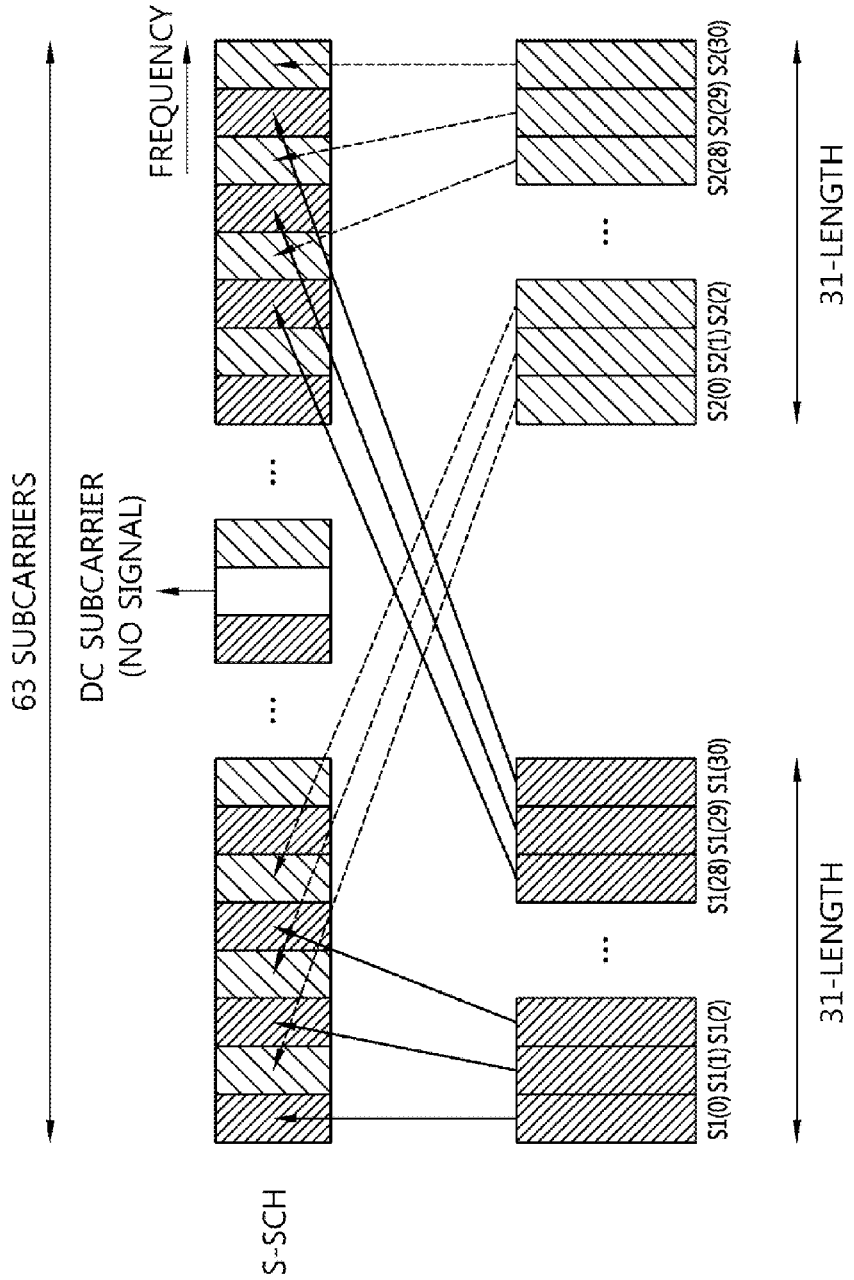
FIG. 7 illustrates an example where two sequences in a logical area are interleaved and mapped in a physical area.

FIG. 7 illustrates an example where two sequences in a logical area are interleaved and mapped in a physical area.

Referring to FIG. 7, when two m-sequences used for generating an SSS code are defined as S1 and S2, respectively, if an SSS of sub-frame 0 transmits a cell group ID with a combination (S1, S2), an SSS of sub-frame 5 performs swapping on the combination to be (S2, S1) and transmits (S2, S1), thereby making distinction of a 10 ms frame boundary. The SSS code used in this case utilizes equation: $x^5+x^2+1$, and different circular shifts from each other may be used to generate a total of 31 codes.

For enhanced reception capability, two different PSS-based sequences are defined to be scrambled to the SSS, wherein the scrambling is conducted on S1 and S2 with different sequences. Thereafter, an S1-based scrambling code is defined to perform scrambling on S2. In this case, although the codes of SSS are swapped each 5 ms, the PSS-based scrambling codes are not subjected to swapping. A PSS-based scrambling code may be defined with six circular shifted versions depending on PSS indexes in the m-sequences generated from an equation, $x^5+x^3+1$, and an S1-based scrambling code may be defined with eight circular shifted versions depending on S1 indexes in the m-sequences generated from an equation, $x^5+x^4+x^2+x^1+1$.

Figure 8:
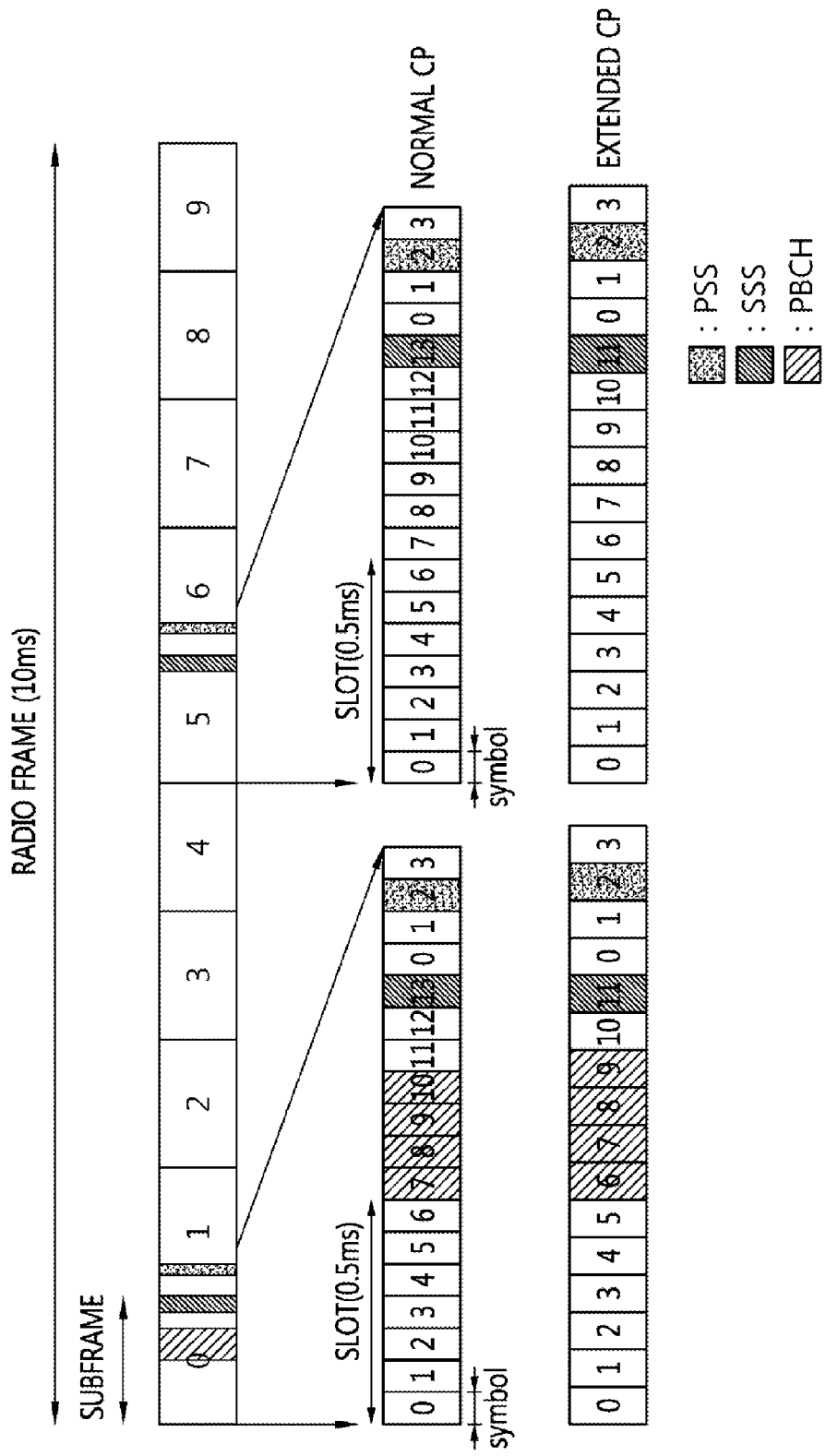
FIG. 8 illustrates an exemplary architecture of a frame for transmitting a synchronization signal in a TDD frame according to a conventional art.

FIG. 8 illustrates an exemplary architecture of a frame for transmitting a synchronization signal in a TDD frame according to a conventional art.

In the TDD frame, PSSs are transmitted in third OFDM symbols of a third slot and a thirteenth slot. SSSs are transmitted before the three OFDM symbols in the OFDM symbol where the PSSs are transmitted. The PBCH is transmitted in the first four OFDM symbols of the first sub-frame.

Figure 9A:
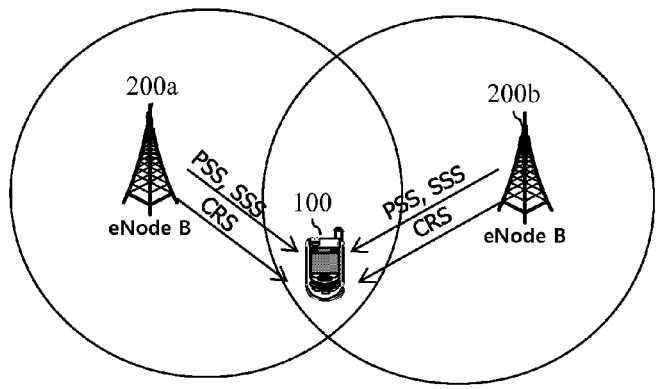
FIG. 9 illustrates an example in which cell identification and cell selection are performed through a synchronization signal.
Figure 9B:
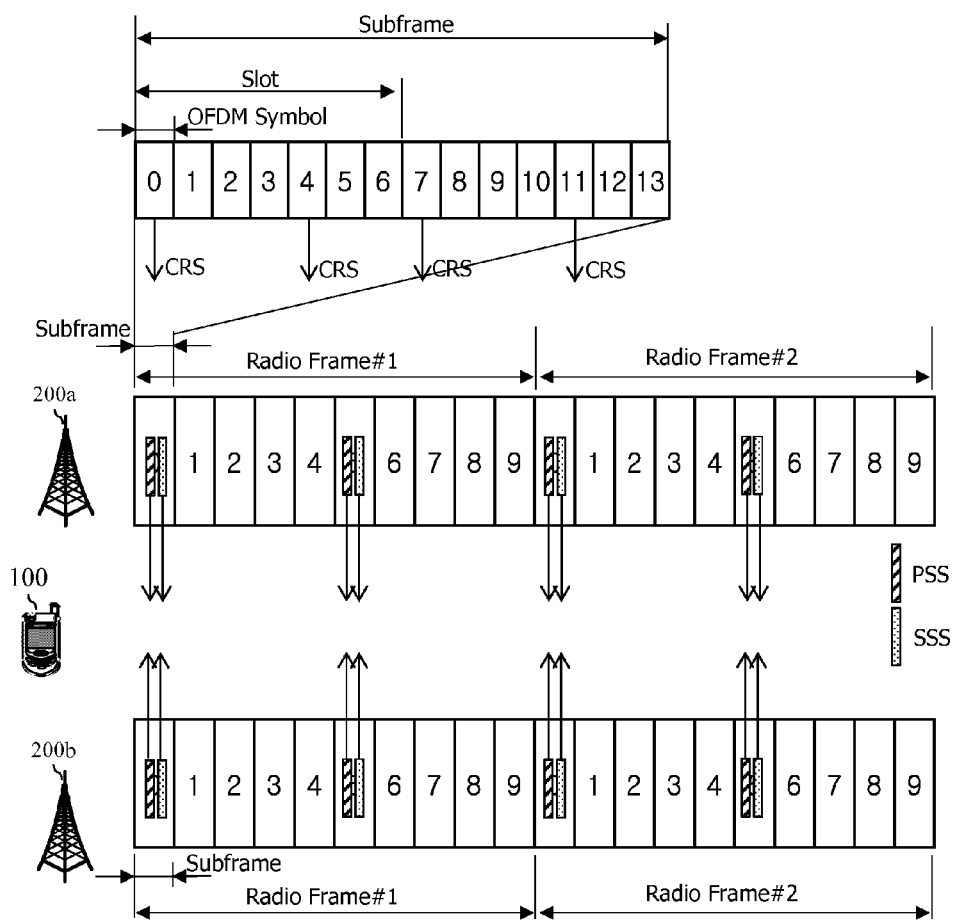

FIG. 9 illustrates an example in which cell identification and cell selection are performed through a synchronization signal.

Referring to FIG. 9(*a*), a plurality of base stations, e.g., a first base station 200*a* and a second base station 200*b*, are provided to be adjacent to each other, and a terminal 100 is positioned in an overlapping area.

First, the base stations 200*a* and 200*b* each transmit a PSS and an SSS.

Accordingly, the terminal 100 may receive the PSSs from the base stations 200*a* and 200*b* and may obtain the cell IDs of the cells formed by the base stations.

Next, each base station 200*a* and 200*b* transmits a CRS (Cell-specific Reference Signal).

Here, as can be seen from the upper part of FIG. 9(*b*), CRSs (Cell-specific Reference Signals) may be transmitted on, e.g., the 0th, 4th, 7th and 11th OFDM symbols of a sub-frame.

For better understanding, the CRS is briefly described below.

For 3GPP LTE systems, two types of downlink radio resources, CRS (or also referred to as common RS) and DRS (dedicated RS, also referred to as UE-specific RS), are defined for unicast services.

A CRS is a reference signal shared by all of the terminals in a cell, and the CRS is used for obtaining information on the channel state and handover measurement.

The terminal measures a CRS, measures RSRP (Reference Signal Received Power) and RSRQ (Reference Signal Received Quality), and informs the same to the base station. Further, the terminal informs the base station of feedback information such as CQI (Channel Quality information), PMI (Precoding Matrix Indicator), RI (Rank Indicator), and the base station performs downlink frequency domain scheduling using the feedback information received from the terminal.

The base station allocates resources considering the amount of radio resources to be assigned to the reference signals, exclusive positions of the CRS and DRS, positions of synchronization channel (SCH) and broadcast channel (BCH) and density of the DRS.

In this case, if relatively more resources are allocated to the resource signals, high channel estimation capability may be obtained, but the data transmission rate is relatively reduced. If relatively less resources are allocated to the resource signals, high data transmission rate may be obtained, but the density of the resource signals is decreased, thus resulting in a deterioration of the channel estimation capability. Accordingly, efficient resource allocation to resource signals considering channel estimation and data transmission rate is a critical factor to system performance.

Meanwhile, CRSs in 3GPP LTE systems are used for both purposes of channel information acquisition and data demodulation. In particular, CRSs are transmitted in each sub-frame over a broad band, and CRSs are transmitted per antenna port in a base station. For example, in case a base station has two transmit antennas, CRSs are transmitted through antenna ports 0 and 1, and in case a base station has four transmit antennas, CRSs are transmitted through antenna ports 0 to 3.

Turning back to FIG. 9(b), the terminal 100 receives CRSs from the base stations 200a and 200b, measures RSRP and RSRQ, and selects a cell having better RSRP and RSRQ.

By thusly selecting the cell, the terminal 100 may receive a PBCH from the base station forming the selected cell, and the terminal 100 may obtain system information through the PBCH. The system information may contain, e.g., the above-described MIB. Further, the terminal 100 may receive a PDSCH from the base station forming the selected cell, and the terminal 100 may obtain SIB through the PDSCH.

Meanwhile, the terminal 100 enters into RRC connected mode through the selected cell.

In sum, the terminal 100 first selects a proper cell, establishes an RRC connection in the cell, and registers the terminal's information in the core network. Thereafter, the terminal 100 transitions to RRC idle mode and stays in the mode. As such, the terminal 100 that transitions to RRC idle mode and stays in the mode (re)selects a cell as necessary and looks into system information or paging information. As such, the terminal 100 that stays in RRC idle mode, when needing to establish an RRC connection, establishes an RRC connection with the RRC layer of the E-UTRAN through an RRC connection procedure and transitions back to RRC connected mode. Here, examples of when the terminal staying in RRC idle mode needs to reestablish an RRC connection include when uplink data transmission is required, e.g., for the reason of the user's attempt to call or when a paging message is received from the E-UTRAN.

Hereinafter, an aspect of the present invention is described.

Figure 10:
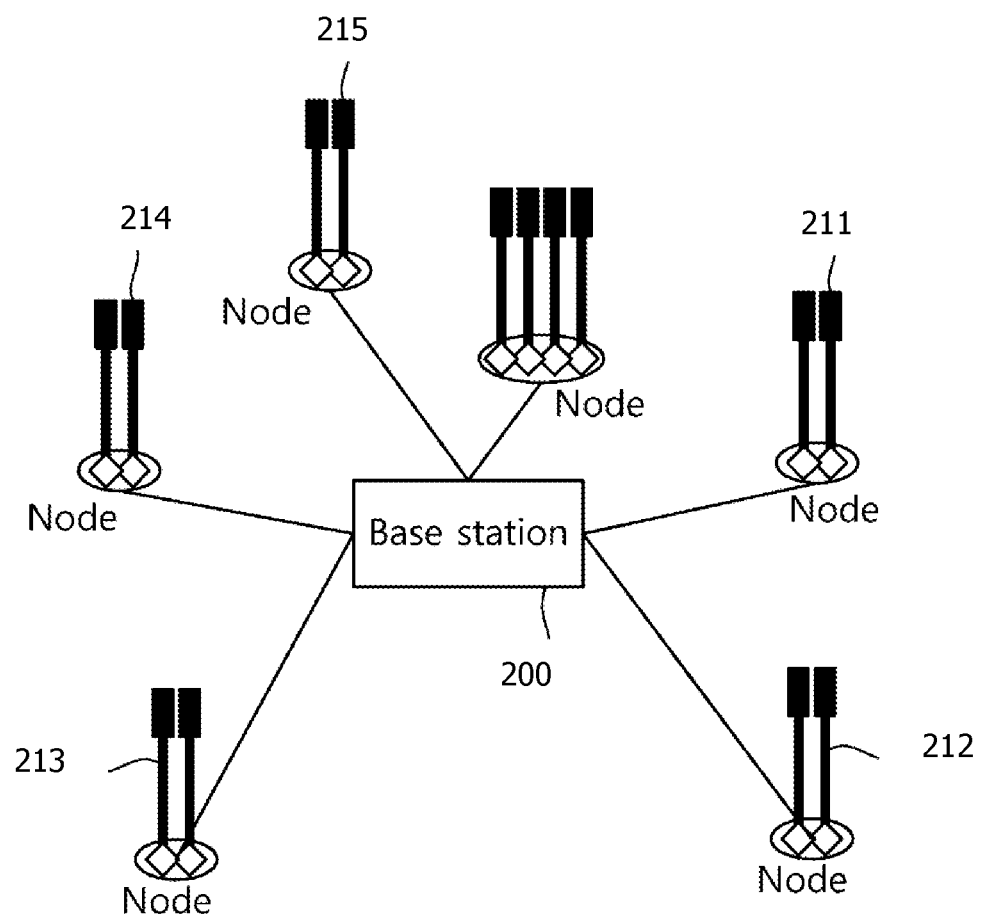
FIG. 10 illustrates an exemplary distributed antenna system.

FIG. 10 illustrates an exemplary distributed antenna system.

First, the DAS means a system in which a single base station manages antennas distributed at various positions in a cell, unlike the CAS (Centralized Antenna System) in which base station (BS, BTS, Node-B, or eNode-B) antennas are concentrated on the center of a cell. The DAS is distinguished from the femto cell or pico cell in that a number of antenna nodes form a single cell. The initial purpose of the DAS was to cover the shadow area by relaying (or repeating) with more antennas installed. However, the DAS may be largely considered as a sort of MIMO (Multiple Input Multiple Output) system in that the base station antennas simultaneously transmit and receive various data to thereby support a single or multiple users. In the point of view of MIMO system, the DAS has merits of high power efficiency that comes from a shorter user-antenna distance than the CAS, high channel capacity due to low correlation and interference between base station antennas, and relatively even communication performance irrespective of the position of the user in the cell.

As can be seen with reference to FIG. 10, the DAS may include a single base station 200 and a plurality of nodes 211, 212, 213, 214, and 215.

The antenna nodes 211, 212, 213, 214, and 215 are wiredly/wirelessly connected with the base station, and the antenna nodes may include one or more antennas. In other words, the plurality of antenna nodes 211, 212, 213, 214, and 215 may be managed by one base station 200. In general, the antennas belonging to a single antenna node tend to be locally in the same spot, with the shortest distance therebetween being within a few meters. The existing DAS techniques consider antennas nodes as antennas or do not discern antenna nodes from antennas. However, the relationship between antenna nodes and antennas should be clearly defined to substantially operate a DAS.

Although the nodes 211, 212, 213, 214, and 215 shown in FIG. 10 have been thus far described as antenna nodes, each node may be any one of a base station, a Node-B, an eNode-B, a pico cell eNb (PeNB), a home eNB (HeNB), a radio remote head (RRH), a relay station (RS) or repeater, and a distributed antenna. One node may have at least one antenna installed. Further, a node may be referred to as a point. Hereinafter, the term "node" means a group of antennas spaced apart from each other by a predetermined interval or more. That is, hereinafter, each node is assumed to physically mean an RRH. However, the present invention is not limited thereto, and a node may be defined as any antenna group regardless of physical intervals. For example, the present invention may apply, assuming that a base station including a plurality of cross polarized antennas consists of a node including horizontal polarized antennas and a node including vertical polarized antennas. Further, the present invention may also apply to a multi-cell system in which each node is a pico cell or femto cell smaller in cell coverage than a macro cell. Hereinafter, the antenna may be replaced with an antenna port, a virtual antenna, or an antenna group as well as the physical antenna.

FIG. 11 illustrates merits of a distributed antenna system.

Figure 11A:
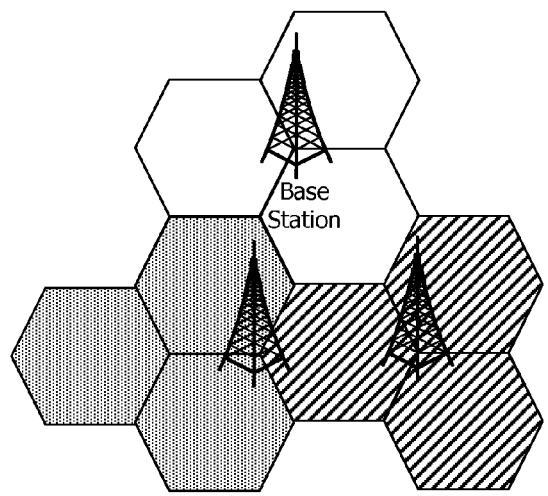
FIG. 11 illustrates merits of a distributed antenna system.

As can be seen with reference to FIG. 11(a), in the existing cellular system, one base station is in charge of, e.g., three sectors, and each base station is connected to a control station (e.g., a BSC or RNC) through a backbone network.

Figure 11B:
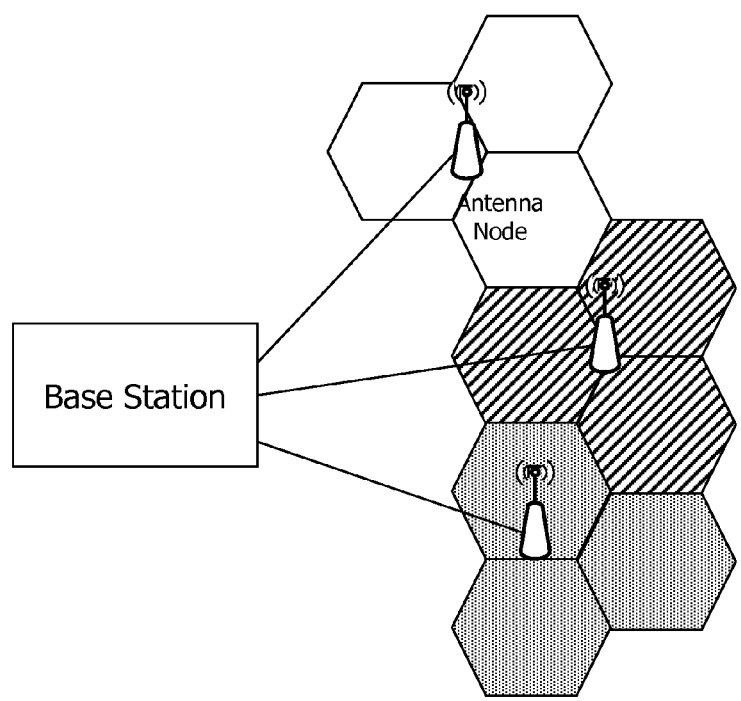

However, as can be seen in connection with FIG. 11(b), each antenna node is disposed in each local area, and a base station may be disposed at a position. This may reduce costs for lands and buildings where base stations are to be installed. Further, the base station may be subjected to easy maintenance at one spot. Further, the backbone network of the base station may be easily managed.

Figure 12:
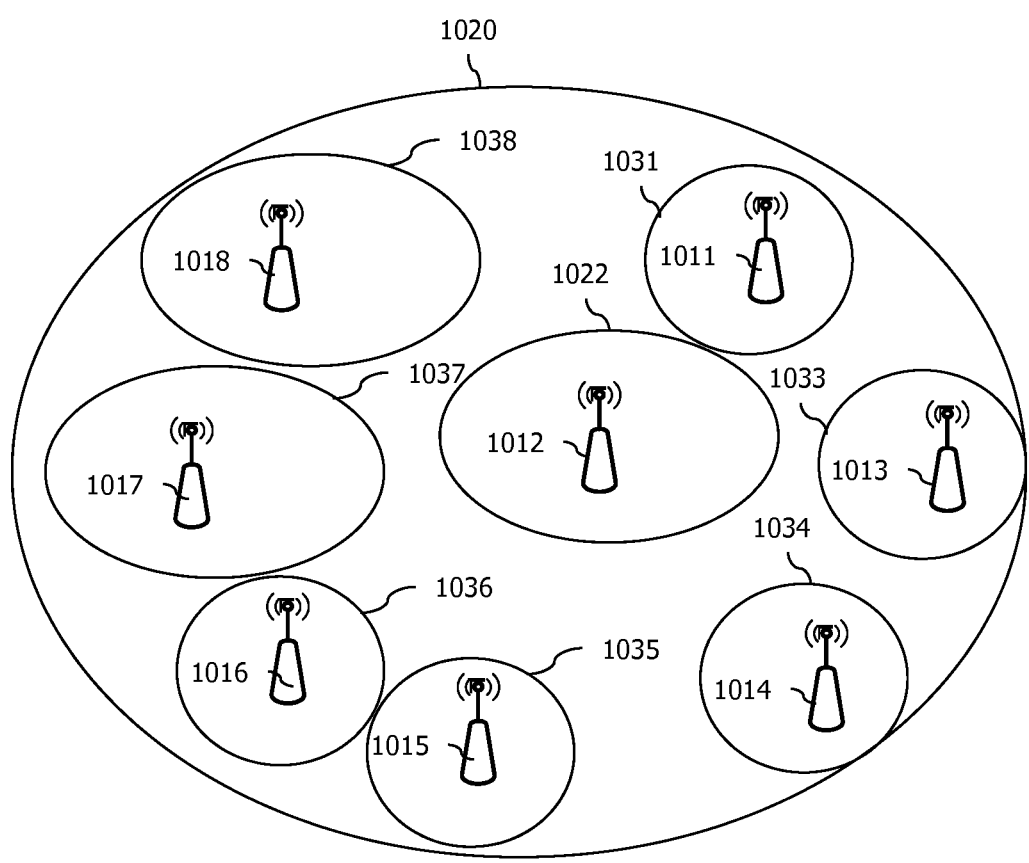
FIG. 12 illustrates an example of operating a distributed antenna system.

FIG. 12 illustrates an example of operating a distributed antenna system.

Referring to FIG. 12, when configuring cells using antenna nodes 1011, 1012, 1013, 1014, 1015, 1016, 1017, and 1018, the cell coverage may be changed depending on the purposes.

In other words, the plurality of antenna nodes 1011, 1012, 1013, 1014, 1015, 1016, 1017, 1018 may be operated as portions of a single cell 1020 as necessary. In this case, the cell 1020 covers a wide-range area, and the cell 1020 may be thus referred to as a large cell, a macro cell, or a metro cell. Such large cell, macro cell, or metro cell may be assigned one cell ID. Accordingly, each antenna node may utilize the same cell ID. In such case, the distributed antenna system (DAS) shown in FIG. 12 may be considered a distributed multi node system (DMNS) forming one cell.

As necessary, the plurality of antenna nodes 1011, 1012, 1013, 1014, 1015, 1016, 1017, 1018, respectively, may form cells 1031, 1032, 1033, 1034, 1035, 1036, 1037, and 1038. In this case, the coverage of each cell 1031, 1032, 1033, 1034, 1035, 1036, 1037, and 1038 is localized to a partial area, and thus, the cells 1031, 1032, 1033, 1034, 1035, 1036, 1037, and 1038 may be denoted small cells, femto cells or pico cells. Such small cells, femto cells, or pico cells each may be assigned a cell ID. That is, each antenna node may be assigned one cell ID. In such case, the distributed antenna system (DAS) shown in FIG. 12 may be considered a multi cell system.

Meanwhile, as necessary, the plurality of antenna nodes 1011, 1012, 1013, 1014, 1015, 1016, 1017, and 1018, respectively, may form cells 1031, 1032, 1033, 1034, 1035, 1036, 1037, and 1038, while all of the antenna nodes form a single cell 1020. As such, the plurality of antenna nodes may be a large cell or macro cell as the antenna nodes together form one cell 1020, or the plurality of antenna nodes each may be a small cell, femto cell or pico cell as the antenna nodes each form their respective cells 1031, 1032, 1033, 1034, 1035, 1036, 1037, and 1038. As such, in case a plurality of cells are configured to be overlaid depending on coverage, the same may be referred to as a multi-tier network.

Meanwhile, freely varying the cell areas as described above may be effective in providing UE-centered services in light of removal of interference and shadow area and efficient power consumption. For example, infrequency of mobility report (i.e., TA (Tracking Update) or handover) is more advantageous to a UE moving at high speed, and thus, wide cell coverage may be more effective to the UE. In contrast, minimizing influence from interference is more advantageous to a UE receiving a high volume of data while traveling at low speed, and smaller cell coverage may be more effective to the UE.

As described above, according to an aspect of the present invention, the plurality of antenna nodes 1011, 1012, 1013, 1014, 1015, 1016, 1017, and 1018, respectively, may form cells 1031, 1032, 1033, 1034, 1035, 1036, 1037, and 1038, while all of the antenna nodes form a single cell 1020, as necessary.

Meanwhile, in case antenna nodes flexibly form a plurality of cells, e.g., large cells and small cells (or femto cells or pico cells) as above, the existing radio frames or subframes need also be enhanced to efficiently distribute radio resources between the plurality of cells formed by one antenna node. In other words, a need exists for an enhancement that allows one antenna node forming a plurality of cells to use radio frames or subframes separately in a TDM (Time Division Multiplexing) or FDM (Frequency Division Multiplexing) scheme depending on the cells.

In other hands, since one antenna node, as necessary, forms a large cell (or macro cell) or forms a small cell (or femto cell or pico cell), different cells IDs are required to discern such situations from each other.

Thus, the existing cell ID-based operation also needs to be enhanced. In other words, there is a need for enhancement that enables transmission signals to be generated using multiple cell IDS in sub-frames or radio frames so that a plurality of cells formed by one antenna node use the radio frames or sub-frames separately in a TDM or FDM scheme. Likewise, an enhancement is needed that enables the terminal to generate transmission signals using different cell IDS from the cell ID obtained from the PSS on the 0th and 5th sub-frames of the radio frame.

Hereinafter, such enhancement of radio frames and assignment of cell IDs are described with reference to FIG. 13.

Figure 13:
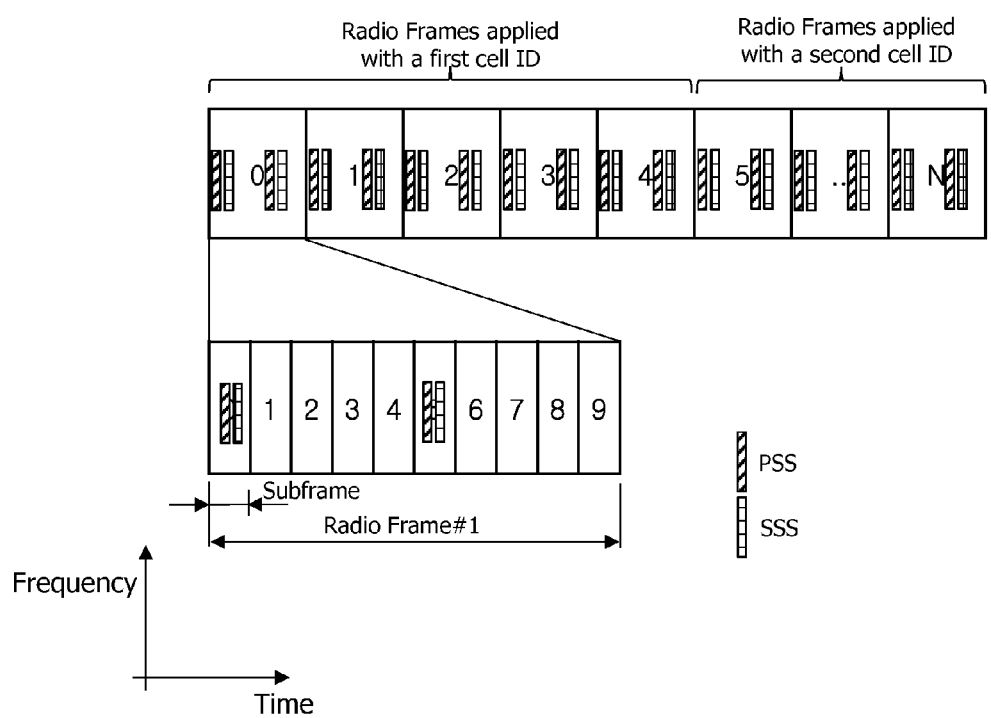
FIG. 13 illustrates an example of assigning each radio frame to a plurality of cells according to an embodiment of the present invention.

FIG. 13 illustrates an example of assigning each radio frame to a plurality of cells according to an embodiment of the present invention.

As can be seen from FIG. 13, each radio frame may be distributed to a plurality of cells according to a TDM scheme.

In other words, as shown in FIG. 13, some radio frames may be used for a first cell ID, and the rest may be used for a second cell ID. One radio frame may include ten sub-frames (sub-frames with indexes 0 to 9) as shown.

For example, as shown, radio frames whose SFNs (System Frame Numbers) are 0 to 4 may be used for the first cell ID, and radio frames whose SFNs are 5 may be used for the second cell ID.

Meanwhile, a radio frame includes ten sub-frames as shown. In this case, synchronization signals, i.e., a PSS and an SSS, are transmitted on the 0th (index 0) and 5th (index 5) sub-frames of each radio frame. The PSS is used for the terminal to obtain a cell ID as described above. Accordingly, in the example shown in FIG. 13, the PSS transmitted on the 0th (index 0) and 5th (index 5) sub-frames of the radio frame whose cell ID changes from the first cell ID to the second cell ID may denote the second cell ID.

Unlike this, the position of a frame used for the second cell ID may be alternatively transmitted to the terminal through cell information or radio resource configuration information. The cell information or radio resource configuration information may contain the second cell ID and the position of the frame. Such cell information or radio resource configuration information may be transmitted through separate control information (for example, RRC message). The separate control information may be transmitted through a general control channel or through a new channel. The new channel may be similar to the sync channel.

Figure 14:
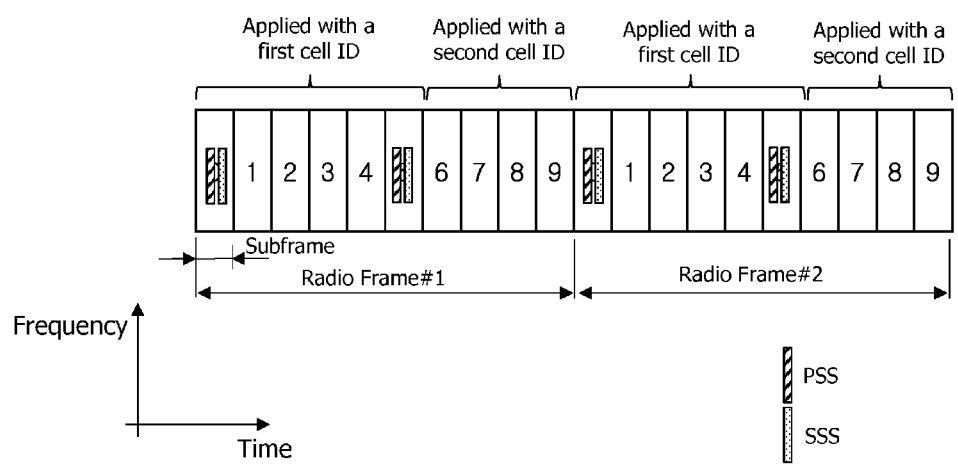
FIG. 14 illustrates an example of assigning each subframe to a plurality of cells according to another embodiment of the present invention.

FIG. 14 illustrates an example of assigning each subframe to a plurality of cells according to another embodiment of the present invention.

As can be seen from FIG. 14, radio frames each include ten sub-frames. In this case, each sub-frame may be distributed to a plurality of cells according to a TDM scheme.

In other words, as shown in FIG. 14, some subframes in a radio frame may be used for a first cell ID, and the rest may be used for a second cell ID.

For example, the 0th (index 0) sub-frame to the 7th (index 7) sub-frame in one radio frame may be used for the first cell ID, and the rest, i.e., the 8th (index 8) sub-frame to the 9th (index 9) sub-frame may be used for the second cell ID. Or, the 0th (index 0) sub-frame to the 3rd (index 3) sub-frame in one radio frame may be used for the first cell ID, and the rest, i.e., the 4th (index 4) sub-frame to the 9th (index 9) sub-frame may be used for the second cell ID.

In this case, it should be noted that synchronization signals, i.e., a PSS and an SSS, are transmitted on the 0th (index 0) and 5th (index 5) sub-frames of each radio frame. The PSS is used for the terminal to obtain a cell ID as described above. Thus, it may be better to the terminal which is not aware of the enhancement according to the present invention to allow at least the 0th to 5th sub-frames to be used for only one cell ID.

Considering this, it is shown that the 0th to 5th sub-frames are used for the first cell ID while the 6th to 9th sub-frames are used for the second cell ID.

Meanwhile, the position of the subframes used for the second cell ID may be alternatively transmitted to the terminal through cell information or radio resource configuration information. The cell information or radio resource configuration information may contain the second cell ID and the position of the subframes. Such cell information or radio resource configuration information may be transmitted through separate control information (for example, RRC message). Or, the cell information or radio resource configuration information may be transmitted through a general control channel or through a new channel. The new channel may be similar to the sync channel.

Figure 15:
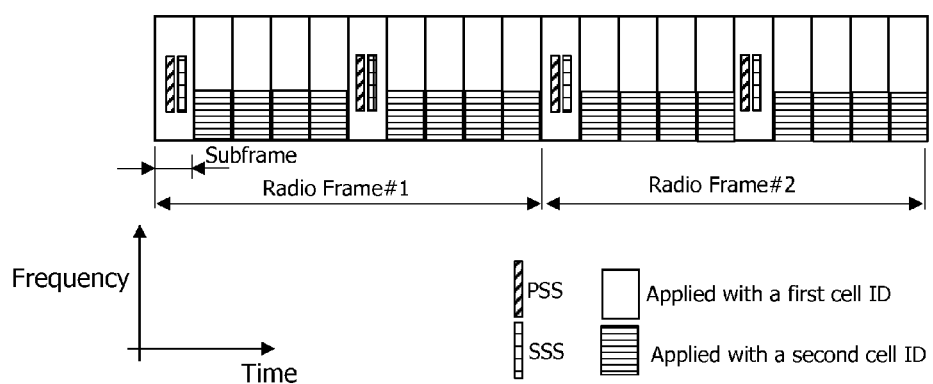
FIG. 15 illustrates an example of assigning each frequency domain unit to a plurality of cells according to still another embodiment of the present invention.

FIG. 15 illustrates an example of assigning each predetermined frequency domain unit to a plurality of cells according to still another embodiment of the present invention.

As can be seen from FIG. 15, radio frames each include ten sub-frames. In this case, each predetermined frequency domain unit may be distributed to a plurality of cells according to an FDM scheme. The term "predetermined frequency domain unit" may refer to a resource block unit or a sub-carrier unit. For example, as shown in FIG. 15, some resource blocks in a sub-frame may be used for a first cell ID, and the rest may be used for a second cell ID. As such, the resource blocks used for the second cell ID may be referred to VRBs (Virtualized Resource blocks), and the resource blocks used for the first cell ID as PRBs (Physical Resource blocks) in the relative point of view. As referred to as above, in case the sub-frames simultaneously use the first cell ID and the second cell ID as shown in FIG. 15, in discerning the VRBs from the PRBs, a second cell ID application section may be primarily mapped according to a configuration criterion in the first cell ID, and secondary mapping may be conducted using the second cell ID in the resource blocks to which the second cell ID applies.

Meanwhile, as described above, a synchronization signal, e.g., a PSS, is transmitted on the 0th (index 0) and 5th (index 5) sub-frames of the radio frame is transmitted, and the terminal may obtain only one cell ID therethrough. Thus, the second cell information or radio resource information (for example, the second cell ID and information regarding sub-carriers or resource blocks for the second cell) should be separately transmitted from the cell to the terminal. The information on the sub-carriers or resource blocks may be an index indicating the position of the same.

Such second cell information or radio resource configuration information may be transmitted through separate control information (for example, RRC message). The separate control information may be transmitted through a general control channel or data channel or through a new channel. The new channel may be similar to the sync channel.

Various examples in which a plurality of cells formed by one antenna node share sub-frames or radio frames according to embodiments of the present invention have been described above. Hereinafter, an operation of a terminal is described.

Figure 16:
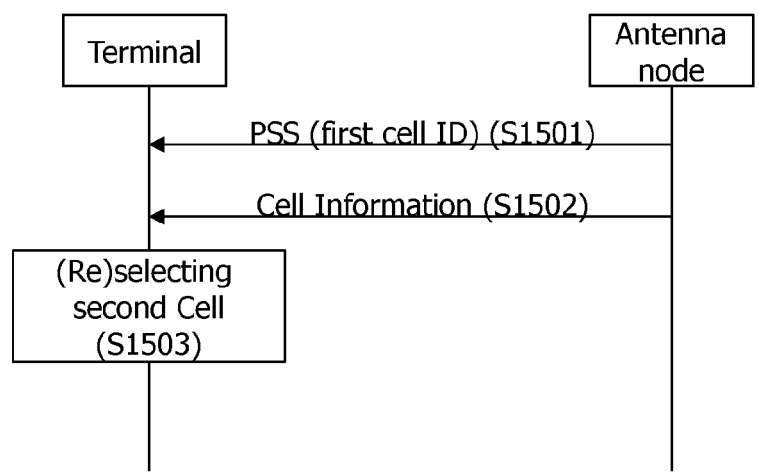
FIG. 16 is a flowchart illustrating an operation of a terminal according to an embodiment of the present invention.

FIG. 16 is a flowchart illustrating an operation of a terminal according to an embodiment of the present invention.

It is assumed that the antenna node shown in FIG. 16 forms a plurality of cells (i.e., a large cell and small cells (or femto cells or pico cells) as described above. It is also assumed that the plurality of cells include two cells, i.e., a first cell and a second cell, for ease of description.

The terminal receives, from the antenna node, PSSs transmitted on the 0th and 5th sub-frames of a radio frame (S1501) and the terminal may obtain the ID of the first cell therethrough.

Subsequently, the terminal receives cell information or radio resource configuration information (S1502). The cell information or radio resource configuration information may contain the second cell ID as described above. The cell information or radio resource configuration information may include the position of a frame to which the second cell ID applies or the position of a sub-frame or a position in the frequency domain as in various embodiments of the present invention. Such cell information or radio resource configuration information may be transmitted through, e.g., a RRC message. In this case, the terminal should remain in RRC connected mode to receive the RRC message. Alternatively, the cell information or radio resource configuration information may be received through a typical control channel.

Subsequently, the terminal selects (or reselects) the second cell as necessary or as requested (S1503), and the terminal determines a sub-frame to which the second cell ID applies.

Meanwhile, although not shown, the cell ID may be varied as necessary. When the ID is varied as such, the terminal may operate as follows.

First, when there is a terminal performing transmission/reception in a section (radio frame or sub-frame) where the first cell ID applies, varying the first cell ID may be achieved by performing a handover procedure. However, varying the second cell ID requires a procedure other than handover. The reason is why the terminal may attempt to shift to a section where the second cell ID applies anytime after the terminal has obtained the second cell ID before change as described above. In case despite change of the second cell ID, the terminal attempts to perform transmission/reception using the previous second cell ID after shifting to the section where the second cell ID applies, such attempt is high likely to fail. The reason is why the cell ID is used as seed value for generating scrambling sequences such as PUSCH, PUCCH, PDCCH, PDSCH, PPCH, and PHICH. Accordingly, considering dynamic change of the cell ID, the changed, it may be better to deliver a changed, new ID to the terminal through a control channel (e.g., a PDCCH or ePDCCH) in the section where the first cell ID applies. Further, considering a semi-static change, the changed, new ID may also be transmitted through a higher control message (e.g., an RRC message).

Next, when there is a terminal performing transmission and reception in a section (radio frame or sub-frame) where the second cell ID applies, changing the second cell ID needs to be also taken into consideration, and to this end, two modes, e.g., fallback mode and immediate change mode, may be considered.

First, in the case of fallback mode: when there is a terminal performing transmission and reception in a section where the second cell ID applies, in case the second cell ID of the terminal needs to be changed (for example, change of antenna nodes), the terminal may be adapted to monitor a control channel (e.g., PDCCH or ePDCCH) of the first cell ID section and to obtain a new second cell ID which has been changed through the received control channel. In this case, a fallback sub-frame (or frame) may be placed in the section where the first cell ID applies for easy operation of the terminal, and the position may be transmitted through a separate control message (for example, RRC message).

Second, in the case of immediate change mode: When there is a terminal performing transmission and reception in a section where the second cell ID applies, in case the second cell ID of the terminal needs to be changed, the terminal is adapted to obtain a directly changed, new ID from a control channel (e.g., a PDCCH or ePDCCH) in a section where the second cell ID applies. In this case, the base station should be instructing the terminal to perform measurement in order for the terminal to properly obtain the changed, new second cell ID. To that end, the existing CSI-RS may be utilized, or a sync signal may be added in a new scheme.

On the other hand, an enhancement is required for a method of operating cell IDs unlike the conventional art.

Typically, the existing cell IDs are obtained from the PSSs on the 0th and 5th sub-frames of the radio frame, and the obtained cell IDs are used for seed values for generating scrambling sequences such as PUSCH, PUCCH, PDCCH, PDSCH, PPCH, and PHICH for interference mitigation, identifiers in mobility measurement and updating TAs (tracking areas). Further, the cell IDs are also used for various purposes in the physical layer and the MAC layer for interference mitigation of RSs (Reference Signals).

If each antenna node uses multiple cell IDs, the range in which the cell ID is used may be limited by the purposes thereof. For example, a cell ID assigned for a small cell formed by the antenna node may be limited to only the purpose for the terminal to perform measurement in connected mode or interference mitigation in a small area. Further, a cell ID assigned for a large cell formed by the antenna node may be limited to only the purpose for the terminal to perform TA (Tracking Area) update, mobility measurement, handover, and measurement in idle mode. Further, the cell ID assigned for the large cell may be limited to use by some users' terminals in conducting measurement and large region interference mitigation in connected mode.

Figure 17:
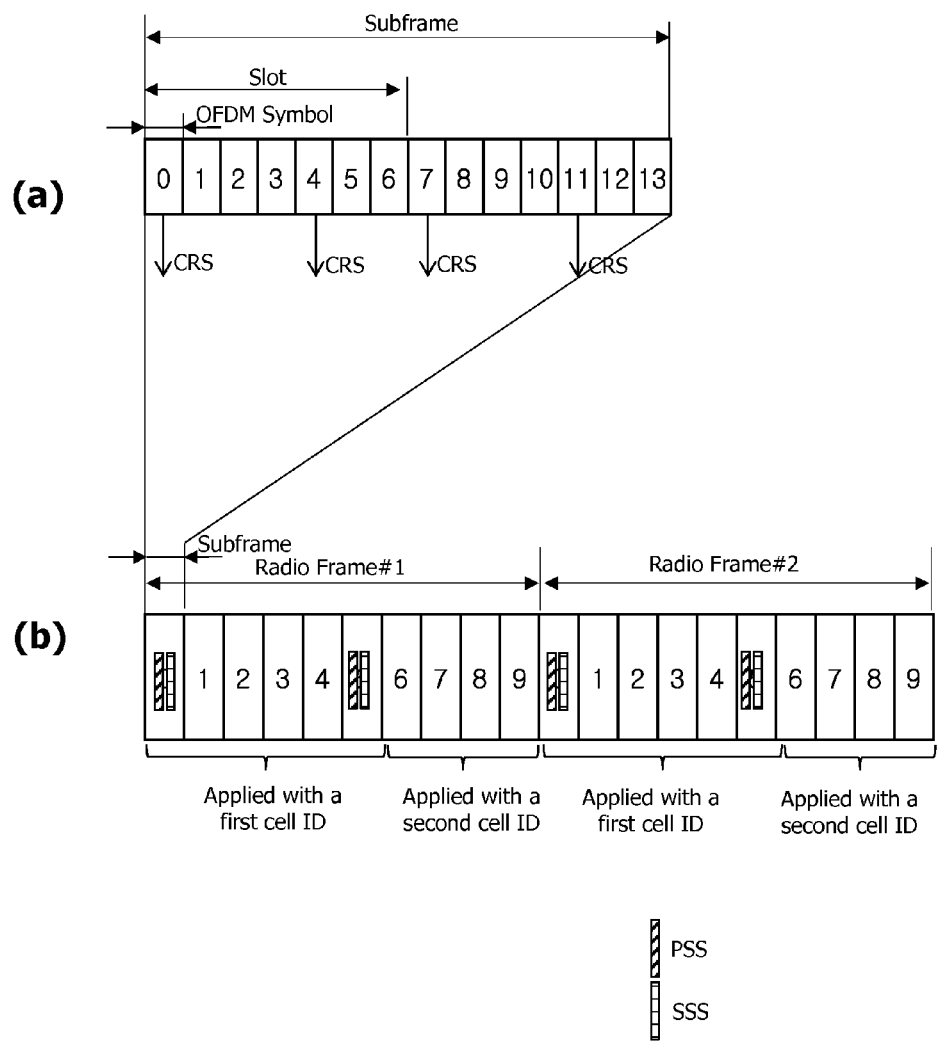
FIG. 17 is a flowchart illustrating an operation of a terminal according to another embodiment of the present invention.

FIG. 17 is a flowchart illustrating an operation of a terminal according to another embodiment of the present invention.

As shown in FIG. 17(a), a sub-frame includes two slots, and each slot includes seven OFDM symbols, for example. Accordingly, the sub-frame may include 14 OFDM symbols.

Here, CRSs (Cell-specific Reference Signals) may be transmitted on, e.g., the 0th, 4th, 7th and 11th OFDM symbols of a sub-frame.

Referring to FIG. 17(b), it is shown that the 0th to 5th sub-frames are used for the first cell ID while the 6th to 9th sub-frames are used for the second cell ID, for example.

In the circumstance as shown, the terminal measures RSRP and RSRQ using the CRSs received in every sub-frame. That is, the terminal measures RSRP and RSRQ through the CRSs received on the 0th to 5th sub-frames that use the first cell ID and the terminal measures RSRP and RSRQ through the CRSs received on the 6th to 9th sub-frames that use the second cell ID.

However, depending on situations, the RSRP and RSRQ measured through the CRSs received on the 0th to 5th sub-frames that use the first cell ID may differ from the RSRP and RSRQ measured through the CRSs received on the 6th to 9th sub-frames that use the second cell ID. Resultantly, the conditions under which the terminal conducts cell selection, cell reselection, or handover may be frequently met.

To address such technical issues, according to an embodiment of the present invention, in case a plurality of cells formed by one antenna node are divided for each sub-frame or radio frame upon use, although the terminal measures the RSRP and RSRQ using the CRSs received in each sub-frame and reports the same to the base station, the base station is set to disregard the RSRP and RSRQ measured in a sub-frame corresponding to any one cell section.

A scheme in which radio frames or sub-frames are efficiently distributed and used between a plurality of cells formed by one antenna node and a scheme of assigning different cell IDs to distinguish a plurality of cells formed by one antenna node from each other have been described above, according to embodiments of the present invention. Alternatively, the cell ID may be replaced with a service ID, a region ID, an RRH (Remote Radio Head) ID or virtual cell ID, or a UE ID according to the form to which the network evolves in the future.

The embodiments disclosed herein may be implemented by various means. For example, the embodiments of the present invention may be implemented by hardware, software, or a combination thereof.

A specific example is described with reference to FIG. 18.

Figure 18:
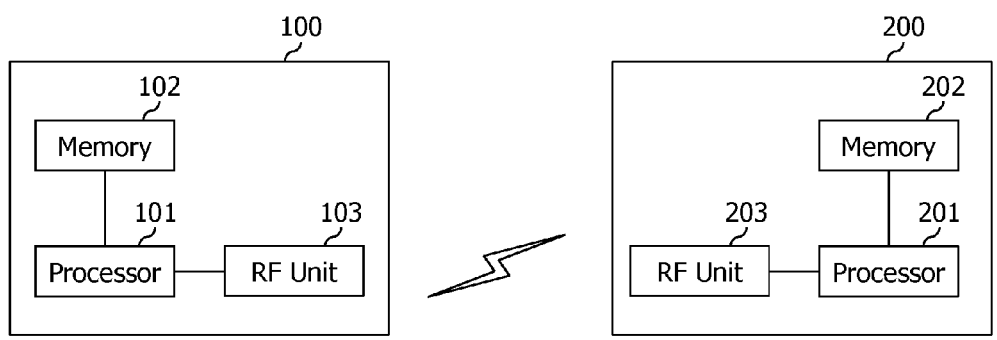
FIG. 18 is a block diagram illustrating a wireless communication system where an embodiment of the present invention is implemented.

FIG. 18 is a block diagram showing a wireless communication system to implement an embodiment of the present invention.

The base station 200 a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

A wireless device 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the wireless device may be implemented by the processor 101.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The present invention may be used in a terminal, base station, or other equipment in a wireless mobile communication system.

What is claimed is:

1. A method for determining a radio resource, the method performed by a terminal and comprising:
   receiving, by a transceiver of the terminal and from a first cell, information on a second cell,
   wherein the first cell and the second cell use a radio resource in-turn according to a time division multiplexing (TDM) technique,
   wherein the radio resource includes a plurality of radio frames along a time axis, each radio frame including a plurality of sub-frames, and
   wherein the information on the second cell includes an ID of the second cell; and
   determining, by a processor of the terminal, the second cell's radio resource using the information on the second cell,
   wherein the determined radio resource of the second cell corresponds to a partial region in the radio frame or the sub-frame,
   wherein the determined radio resource of the second cell includes a plurality of sub-frames where no control information for the first cell is transmitted; and
   wherein a sub-frame where the control information for the first cell is transmitted is a sub-frame where a primary synchronization signal and a secondary synchronization signal are transmitted.

2. The method of claim 1, wherein the information on the second cell is received through an RRC message or a control channel.

3. The method of claim 1, wherein on the partial region in the radio frame or sub-frame of the first cell a reference signal received power (RSRP) and a reference signal received quality (RSRQ) are measured, but are not used as a criterion for handover.

4. The method of claim 1, further comprising when a cell reselection to the second cell or a handover to the second cell is performed, transmitting and receiving data on the determined radio resource.

5. A terminal, comprising:
   a transceiver configured to receive, from a first cell, information on a second cell,
   wherein the first cell and the second cell use a radio resource in-turn according to a time division multiplexing (TDM) technique,
   wherein the radio resource includes a plurality of radio frames along a time axis, each radio frame including a plurality of sub-frames, and
   wherein the information on the second cell includes an ID of the second cell; and
   a processor operatively connected to the transceiver and configured to determine the second cell's radio resource using the information on the second cell,
   wherein the determined radio resource of the second cell corresponds to a partial region in the radio frame or the sub-frame,
   wherein the determined radio resource of the second cell includes a plurality of sub-frames where no control information for the first cell is transmitted, and
   wherein a sub-frame where the control information for the first cell is transmitted is a sub-frame where a primary synchronization signal and a secondary synchronization signal are transmitted.

6. The terminal of claim 5, wherein the information on the second cell is received through an RRC message or a control channel.

7. The terminal of claim 5, wherein on the partial region in the radio frame or sub-frame of the first cell a reference signal received power (RSRP) and a reference signal received quality (RSRQ) are measured, but are not used as a criterion for handover.

8. The terminal of claim 5, wherein when a cell reselection to the second cell or a handover to the second cell is performed, transmitting and receiving data on the determined radio resource.

* * * * *